(12) United States Patent
Simpson

(10) Patent No.: US 11,493,100 B2
(45) Date of Patent: Nov. 8, 2022

(54) ADJUSTABLE MASS CLUTCH WEIGHT

(71) Applicant: Don Simpson, Phoenix, AZ (US)

(72) Inventor: Don Simpson, Phoenix, AZ (US)

( * ) Notice: Subject to any disclaimer, the term of this patent is extended or adjusted under 35 U.S.C. 154(b) by 0 days.

(21) Appl. No.: 17/494,758

(22) Filed: Oct. 5, 2021

(65) Prior Publication Data

US 2022/0145948 A1  May 12, 2022

Related U.S. Application Data

(60) Provisional application No. 63/112,027, filed on Nov. 10, 2020.

(51) Int. Cl.
*F16D 43/06* (2006.01)

(52) U.S. Cl.
CPC ................... *F16D 43/06* (2013.01)

(58) Field of Classification Search
CPC ...................................... F16D 43/06
See application file for complete search history.

(56) References Cited

U.S. PATENT DOCUMENTS

| | | | | |
|---|---|---|---|---|
| 5,562,555 A | * | 10/1996 | Peterson | F16H 55/563 |
| | | | | 192/105 CD |
| 5,795,255 A | * | 8/1998 | Hooper | F16H 61/66245 |
| | | | | 474/70 |
| 9,593,759 B2 | * | 3/2017 | Millard | F16H 55/563 |
| 2012/0214626 A1 | * | 8/2012 | Cook | F16H 55/563 |
| | | | | 474/14 |

* cited by examiner

*Primary Examiner* — Huan Le
(74) *Attorney, Agent, or Firm* — Schmeiser, Olsen & Watts LLP

(57) ABSTRACT

An adjustable mass clutch weight for use in a CVT clutch is provided. The adjustable mass clutch weight may include an elongate body having a heel and a tip; a first protrusion having external threads extending from a first side of the elongate body at the heel. The adjustable mass clutch weight may also include a second protrusion having external threads extending from a second side of the elongate body at the heel. The adjustable mass clutch weight may also include a mounting aperture extending through the first protrusion, the elongate body and the second protrusion; and at least one mass adjustment weight with a threaded aperture extending through the at least one mass adjustment weight. The at least one mass adjustment weight may be coupled to the first threaded protrusion and/or the second threaded protrusion to adjust the mass of the adjustable mass clutch weight at the heel of the elongate body.

20 Claims, 2 Drawing Sheets

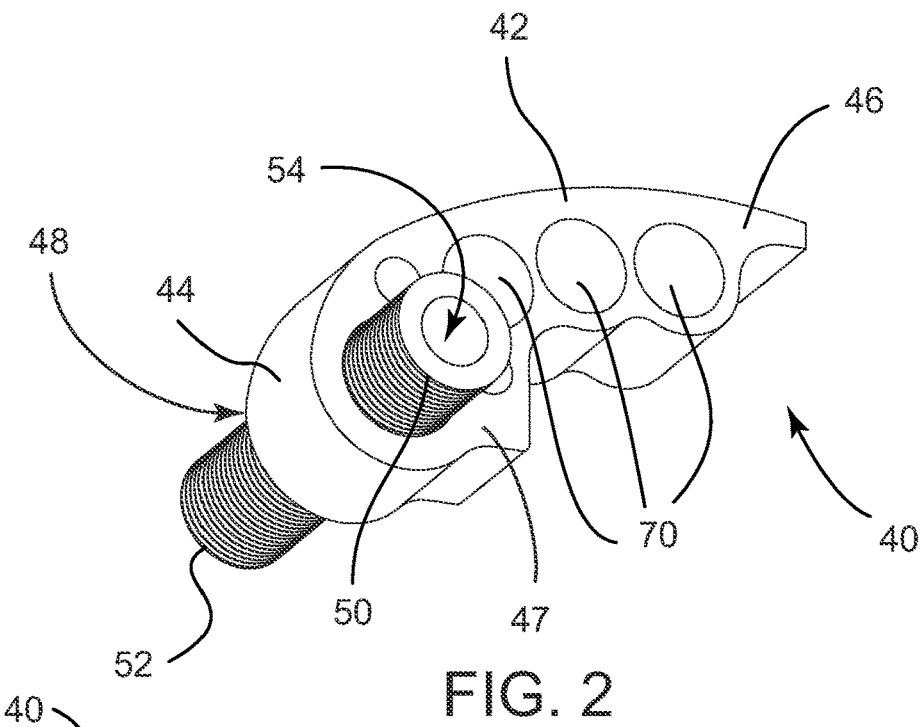
FIG. 2
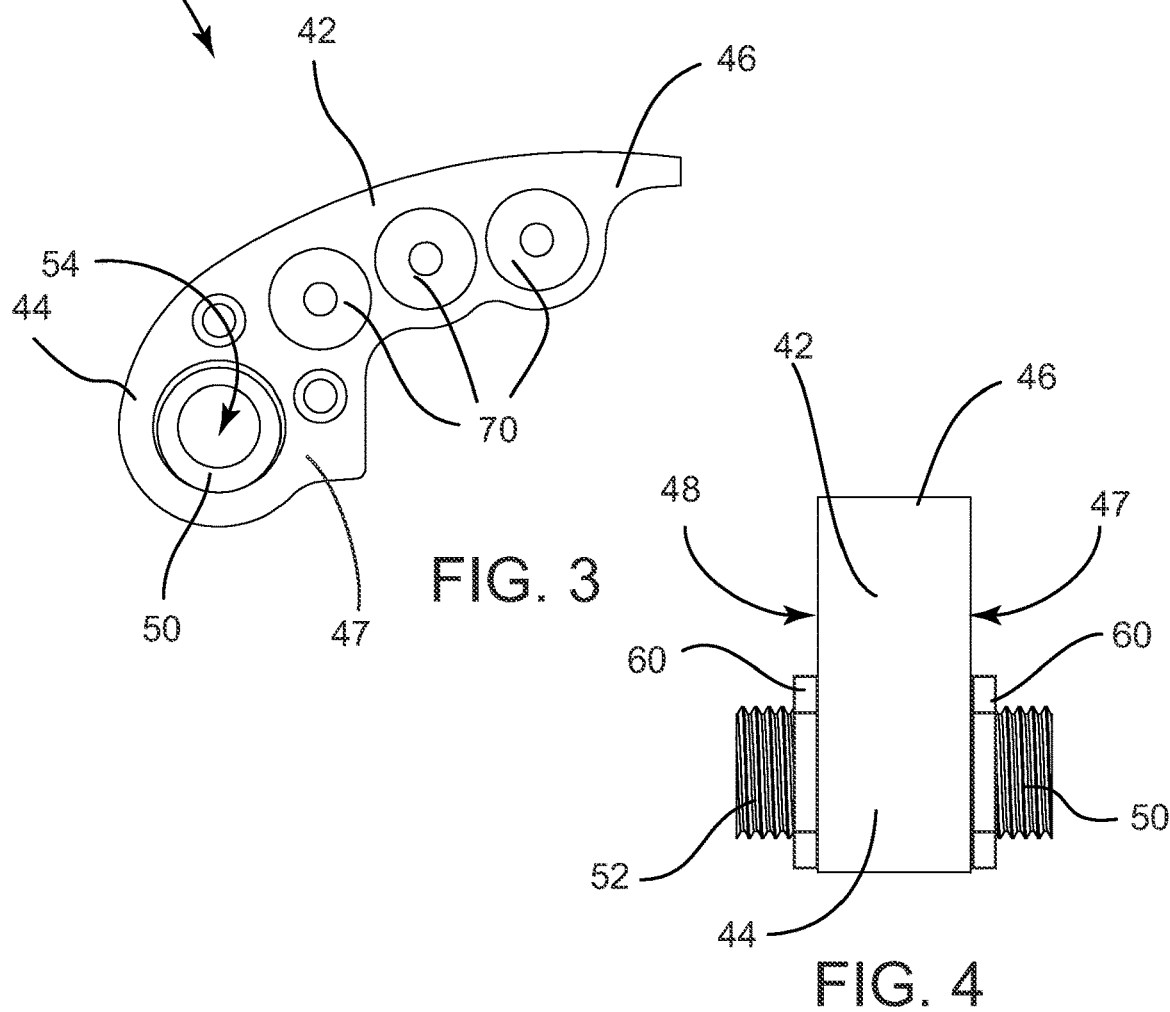
FIG. 3
FIG. 4

ADJUSTABLE MASS CLUTCH WEIGHT

CROSS REFERENCE TO RELATED APPLICATION

This application claims priority to U.S. Provisional Patent Application entitled "ADJUSTABLE MASS CLUTCH WEIGHT," Ser. No. 63/112,027, filed Nov. 10, 2020, the disclosure of which is hereby incorporated entirely herein by reference.

BACKGROUND OF THE INVENTION

Technical Field

This invention relates generally to a clutch weight for a continuous variable transmission clutch and more particularly to an adjustable mass clutch weight for use in a continuous variable transmission clutch.

State of the Art

A continuous variable transmission ("CVT") clutch ("CVT clutch") is commonly used in off-road vehicles such as, but not limited to, UTVs, ATVs, snowmobiles, and the like. A CVT varies ratio based on vehicle speed, engine RPM or load. The CVT is designed to operate at optimal power for varying vehicle driving conditions. In operation a primary clutch includes a stationary sheave and a moveable sheave. The moveable sheave utilizes clutch weights to move the moveable sheave toward and away from the stationary sheave in order to engage and disengage the drive belt.

Primary clutches include a spider assembly formed of a spider with rollers and washers that are engaged by the clutch weights to allow the moveable sheave to move. Drivers seek for the ability to tune these clutch weights in order to tune the operation of the clutch for the desired power and so forth generated through the clutch.

Accordingly, there is a need in the field of CVT clutches for improved adjustable mass clutch weights for use in clutches.

SUMMARY OF THE INVENTION

The present invention relates to an adjustable mass clutch weight for use in a CVT clutch that allows for tuning of the operation of the CVT clutch, wherein tuning the operation of the CVT clutch includes adjusting the acceleration and revolutions per minute (RPM) of the CVT clutch during operation.

Disclosed is an adjustable mass clutch weight for use in a continuous variable transmission clutch, the adjustable mass clutch weight comprising: an elongate body having a heel and a tip; a first protrusion having external threads extending from a first side of the elongate body at the heel of the elongate body; a second protrusion having external threads extending from a second side of the elongate body at the heel of the elongate body; a mounting aperture extending through the first protrusion, the elongate body and the second protrusion; and at least one mass adjustment weight with a threaded aperture extending through the at least one mass adjustment weight, wherein the at least one mass adjustment weight is coupled to the first protrusion and/or the second protrusion to adjust mass of the adjustable mass clutch weight at the heel of the elongate body. The elongate body may comprise at least one recess between the heel and the tip. At least one weighted mass may be coupled within the at least one recess. At least one magnet may be coupled within the at least one recess. The mounting aperture may be configured to receive a mounting pin for mounting the adjustable mass clutch weight into a functional position with the clutch. The at least one mass adjustment weight may be coupled to the first protrusion or the second protrusion. Multiple mass adjustment weights may be coupled to each of the first protrusion and the second protrusions. The multiple mass adjustment weights may be of differing masses. The first protrusion and the second protrusion may be equal in length.

Disclosed is a combination continuous variable transmission clutch and an adjustable mass clutch weight, the adjustable mass clutch weight comprising: an elongate body having a heel and a tip; a first protrusion having external threads extending from a first side of the elongate body at the heel of the elongate body; a second protrusion having external threads extending from a second side of the elongate body at the heel of the elongate body; a mounting aperture extending through the first protrusion, the elongate body and the second protrusion; and at least one mass adjustment weight with a threaded aperture extending through the at least one mass adjustment weight, wherein the at least one mass adjustment weight is coupled to the first protrusion and/or the second protrusion to adjust mass of the adjustable mass clutch weight at the heel of the elongate body. The continuous variable transmission clutch may comprise a moveable sheave. The elongate body may comprise at least one recess between the heel and the tip. At least one weighted mass may be coupled within the at least one recess. At least one magnet may be coupled within the at least one recess. The mounting aperture may be configured to receive a mounting pin for mounting the adjustable mass clutch weight into a functional position with the clutch. The at least one mass adjustment weight may be coupled to the first protrusion or the second protrusion. Multiple mass adjustment weights may be coupled to each of the first protrusion and the second protrusions. The multiple mass adjustment weights may be of differing masses. The first protrusion and the second protrusion may be equal in length.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 is a perspective view of an adjustable mass clutch weight in accordance with an embodiment;

FIG. 3 is a side view of an adjustable mass clutch weight in accordance with an embodiment; and FIG. 4 is a rear view of an adjustable mass clutch weight in accordance with an embodiment.

DETAILED DESCRIPTION OF EMBODIMENTS OF THE INVENTION

Figure 1:
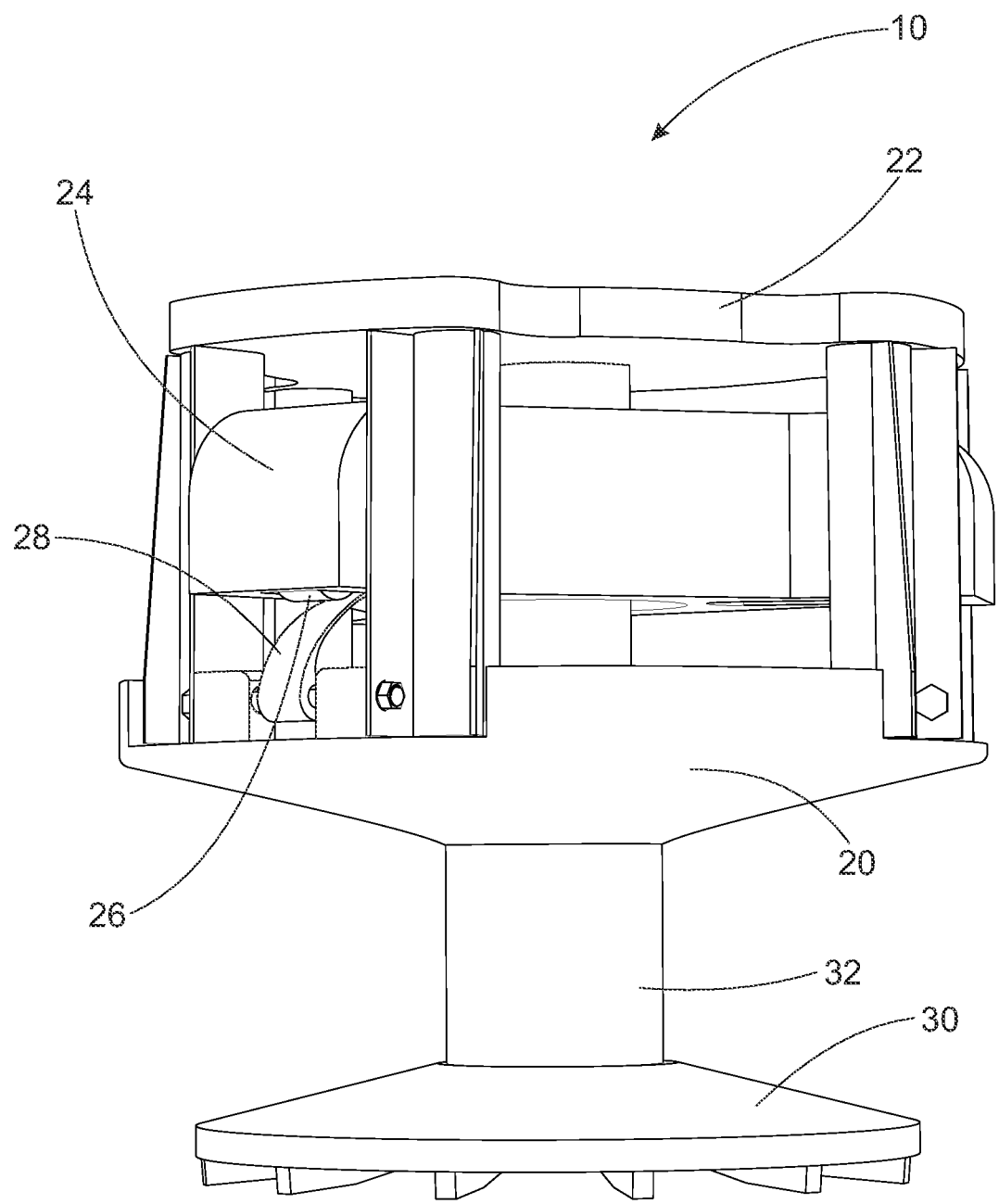
FIG. 1 is a perspective view of a CVT clutch in accordance with an embodiment.

As discussed above, embodiments of the present invention relate to an adjustable mass clutch weight for use in a CVT clutch that allows for tuning of the operation of the CVT clutch, wherein tuning the operation of the CVT clutch includes adjusting the acceleration and RPM of the CVT clutch during operation.

FIG. 1 depicts an embodiment of a CVT clutch 10. The clutch 10 may include a moveable sheave 20, a cover plate 22, a spider 24, clutch weights 28, rollers 26, a fixed sheave 30 and an axle 32. In operation, as the engine increases its speed, the rotation of the clutch 10 provide centrifugal force to rotate the clutch weights 28 against rollers 26 and moves the spider 24. This in turn moves the moveable sheave 20 toward the fixed sheave 30 along axle 32 in order to operate a CVT. As the engine decreases its speed, the moveable sheave 20 moves away from the fixed sheave 30. Adjusting the mass of the clutch weights 28 can affect the way in which the moveable sheave 20 moves toward and away from the fixed sheave 30 during operation of the CVT clutch. This adjustment to the operation of the clutch 10 constitutes tuning the clutch 10 and can be done for the driver's needs or likes.

FIGS. 2-4 depict an adjustable mass clutch weight 40 that would replace the clutch weights 28 discussed above. The adjustable mass clutch weight 40 may include an elongate body 42 having a heel 44 and a tip 46. The adjustable mass clutch weight 40 may also include a first protrusion 50 or boss having external threads extending from a first side 47 of the elongate body 42 at or adjacent the heel 44 of the elongate body 42, and the adjustable mass clutch weight 40 may also include a second protrusion 52 or boss having external threads extending from a second side 48 of the elongate body 42 at or adjacent the heel 44 of the elongate body 42. The length of the first protrusion 50 and the second protrusion 52 may be equal, thereby centering the elongate body 42 between ends of the first protrusion 50 and the second protrusion 52.

The adjustable mass clutch weight 40 may further include a mounting aperture 54 extending through the first protrusion 50, the elongate body 42 and the second protrusion 52. The mounting aperture 54 is configured to receive a mounting pin for mounting the adjustable mass clutch weight 40 into a functional position with the clutch 10. The adjustable mass clutch weight 40 may also include at least one mass adjustment weight 60 with a threaded aperture extending through the at least one mass adjustment weight 60. The at least one mass adjustment weight 60 may be coupled to the first threaded protrusion 50 or the second threaded protrusion 52 to adjust the mass of the adjustable mass clutch weight 40. In some embodiments, multiple mass adjustment weights 60 may be coupled to each of the protrusions 50 and 52 and further still the mass adjustment weights 60 may have differing masses, allowing for combinations of masses to fine tune the operation of the adjustable mass clutch weight 40 within the clutch 10. This adjusts the mass of the adjustable mass clutch weight 40 at the heel 44 of the adjustable mass clutch weight 40.

The adjustable mass clutch weight 40 may also include one or more additional recesses 70 along the elongate body between the heel 44 and the tip 46. Additional mass may be added by coupling magnets, or threaded weights within the recesses 70.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An adjustable mass clutch weight for use in a continuous variable transmission clutch, the adjustable mass clutch weight comprising:
   an elongate body having a heel and a tip;
   a first protrusion having external threads extending from a first side of the elongate body at the heel of the elongate body;
   a second protrusion having external threads extending from a second side of the elongate body at the heel of the elongate body;
   a mounting aperture extending through the first protrusion, the elongate body and the second protrusion; and
   at least one mass adjustment weight with a threaded aperture extending through the at least one mass adjustment weight, wherein the at least one mass adjustment weight is coupled to the first protrusion and/or the second protrusion to adjust mass of the adjustable mass clutch weight at the heel of the elongate body.

2. The adjustable mass clutch of claim 1, wherein the elongate body comprises at least one recess between the heel and the tip.

3. The adjustable mass clutch of claim 2, wherein at least one weighted mass is coupled within the at least one recess.

4. The adjustable mass clutch of claim 2, wherein at least one magnet is coupled within the at least one recess.

5. The adjustable mass clutch weight of claim 1, wherein the mounting aperture is configured to receive a mounting pin for mounting the adjustable mass clutch weight into a functional position with the clutch.

6. The adjustable mass clutch weight of claim 1, wherein the at least one mass adjustment weight is coupled to the first protrusion or the second protrusion.

7. The adjustable mass clutch weight of claim 1, wherein multiple mass adjustment weights are coupled to each of the first protrusion and the second protrusions.

8. The adjustable mass clutch weight of claim 7, wherein the multiple mass adjustment weights are of differing masses.

9. The adjustable mass clutch weight of claim 1, wherein the first protrusion and the second protrusion are equal in length.

10. A combination continuous variable transmission clutch and an adjustable mass clutch weight, the adjustable mass clutch weight comprising:
    an elongate body having a heel and a tip;
    a first protrusion having external threads extending from a first side of the elongate body at the heel of the elongate body;
    a second protrusion having external threads extending from a second side of the elongate body at the heel of the elongate body;
    a mounting aperture extending through the first protrusion, the elongate body and the second protrusion; and
    at least one mass adjustment weight with a threaded aperture extending through the at least one mass adjustment weight, wherein the at least one mass adjustment weight is coupled to the first protrusion and/or the second protrusion to adjust mass of the adjustable mass clutch weight at the heel of the elongate body.

11. The combination of claim 10, wherein the clutch comprises a moveable sheave.

12. The combination of claim 10, wherein the elongate body comprises at least one recess between the heel and the tip.

13. The combination of claim 12, wherein at least one weighted mass is coupled within the at least one recess.

14. The combination of claim 12, wherein at least one magnet is coupled within the at least one recess.

15. The combination of claim 10, wherein the mounting aperture is configured to receive a mounting pin for mounting the adjustable mass clutch weight into a functional position with the clutch.

16. The combination of claim 10, wherein the at least one mass adjustment weight is coupled to the first protrusion or the second protrusion.

17. The combination of claim 10, wherein multiple mass adjustment weights are coupled to each of the first protrusion and the second protrusions.

18. The combination of claim 17, wherein the multiple mass adjustment weights are of differing masses.

19. The combination of claim 10, wherein the first protrusion and the second protrusion are equal in length.

20. A method of using an adjustable mass clutch weight for use in a CVT clutch, the method comprising:
providing the clutch weight comprising:
an elongate body having a heel and a tip;
a first protrusion having external threads extending from a first side of the elongate body at the heel of the elongate body;
a second protrusion having external threads extending from a second side of the elongate body at the heel of the elongate body; and
a mounting aperture extending through the first protrusion, the elongate body and the second protrusion;
adjusting the mass of the clutch weight at the heel of the elongate body in response to coupling at least one mass adjustment weight to the first threaded protrusion or the second threaded protrusion; and
coupling the adjustable mass clutch weight to the CVT clutch.

\* \* \* \* \*